(12) United States Patent
Decker et al.

(10) Patent No.: US 12,227,216 B1
(45) Date of Patent: Feb. 18, 2025

(54) MOBILE AND INTERNET CONNECTED CLEANING CART

(71) Applicants: James Donald Decker, Las Vegas, NV (US); Eric James Decker, Champlin, MN (US); Darrin Swagel, Hopkins, MN (US)

(72) Inventors: James Donald Decker, Las Vegas, NV (US); Eric James Decker, Champlin, MN (US); Darrin Swagel, Hopkins, MN (US)

( * ) Notice: Subject to any disclaimer, the term of this patent is extended or adjusted under 35 U.S.C. 154(b) by 237 days.

(21) Appl. No.: 17/875,491

(22) Filed: Jul. 28, 2022

Related U.S. Application Data

(60) Provisional application No. 63/226,576, filed on Jul. 28, 2021.

(51) Int. Cl.
| | |
|---|---|
| *B62B 3/10* | (2006.01) |
| *A47L 13/12* | (2006.01) |
| *A47L 13/26* | (2006.01) |
| *A47L 13/512* | (2006.01) |
| *B62B 3/00* | (2006.01) |
| *B62B 3/12* | (2006.01) |
| *B62B 5/00* | (2006.01) |
| *H04W 84/12* | (2009.01) |

(52) U.S. Cl.
CPC ............. *B62B 3/104* (2013.01); *A47L 13/12* (2013.01); *A47L 13/26* (2013.01); *A47L 13/512* (2013.01); *B62B 3/004* (2013.01); *B62B 3/102* (2013.01); *B62B 3/12* (2013.01); *B62B 5/00* (2013.01); *B62B 2202/50* (2013.01); *H04W 84/12* (2013.01)

(58) Field of Classification Search
CPC ......... B62B 3/104; B62B 3/004; B62B 3/102; B62B 3/12; B62B 5/00; B62B 2202/50; A47L 13/12; A47L 13/26; A47L 13/512; H04W 84/12

See application file for complete search history.

(56) References Cited

U.S. PATENT DOCUMENTS

2007/0187528 A1* 8/2007 Roth ................... B08B 3/026
                                                   239/304
2018/0310793 A1* 11/2018 Chen .................. A47L 11/4011

FOREIGN PATENT DOCUMENTS

CN          102019947 A * 9/2009 ............... B62B 3/00

* cited by examiner

*Primary Examiner* — Brian P Sweeney
(74) *Attorney, Agent, or Firm* — Plager Schack LLP; Mark H. Plager, Esq.; Stephen Hallberg, Esq.

(57) ABSTRACT

A mobile and internet connected cleaning cart is disclosed. The mobile and internet connected cleaning cart is a movable (mobile) device with a cleaning platform that provides instant access to multiple different dilutions and non-diluted water rinse, as well as a variety of several applicator tools.

14 Claims, 10 Drawing Sheets

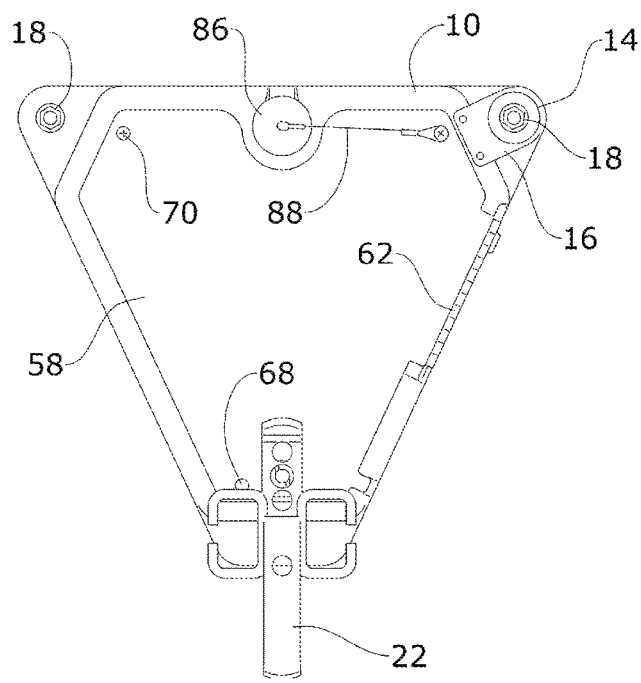
FIG.2A
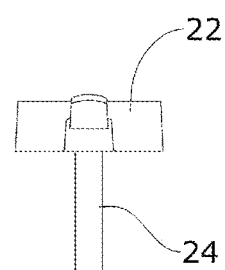
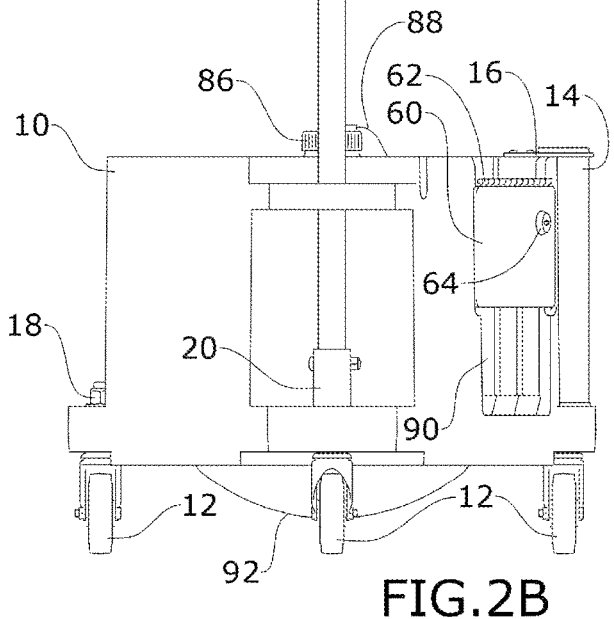
FIG.2B
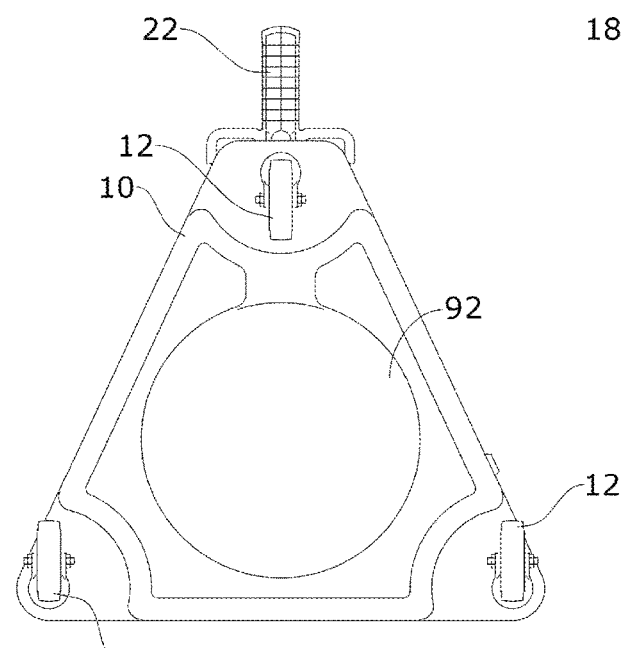
FIG.2C

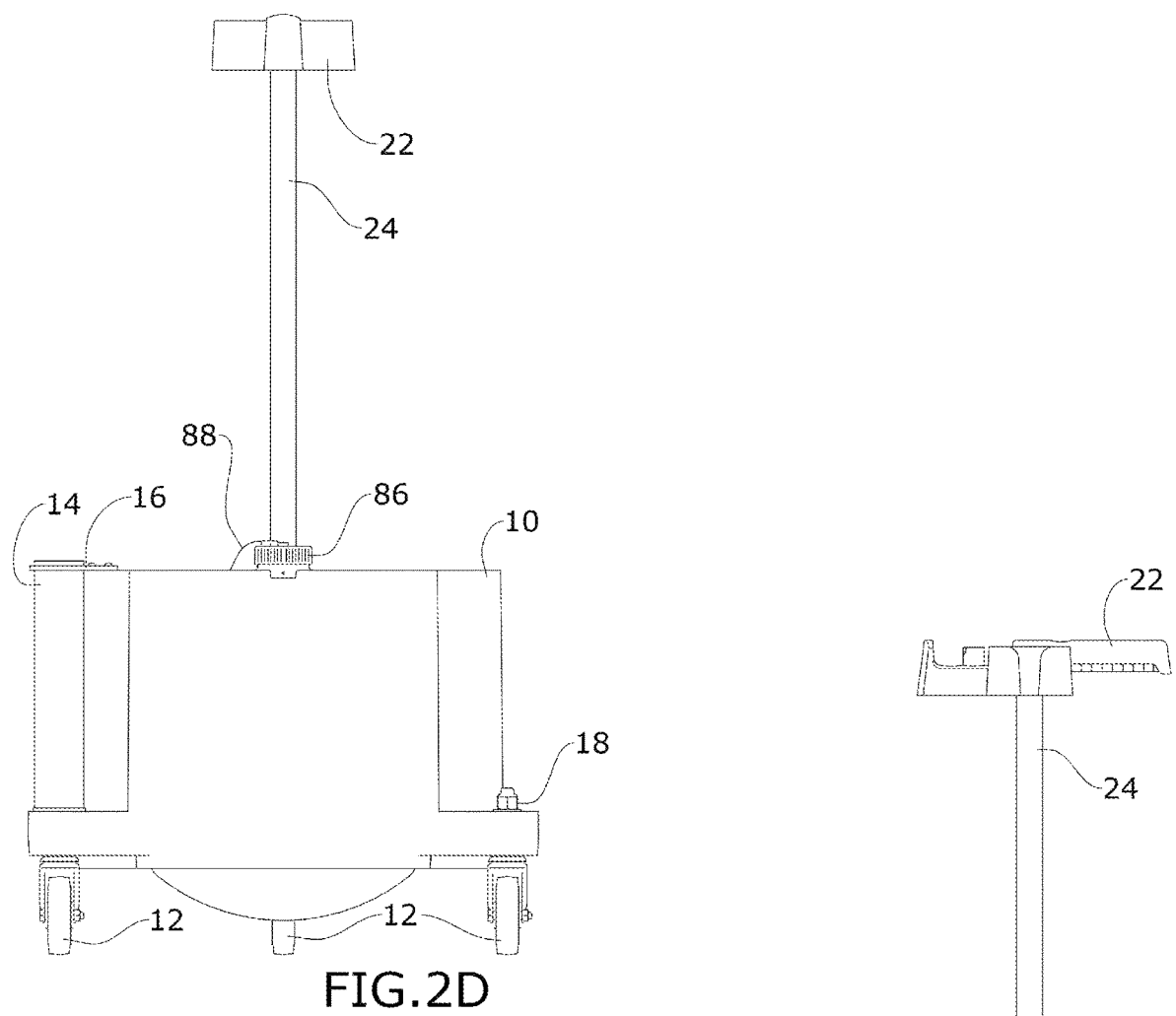
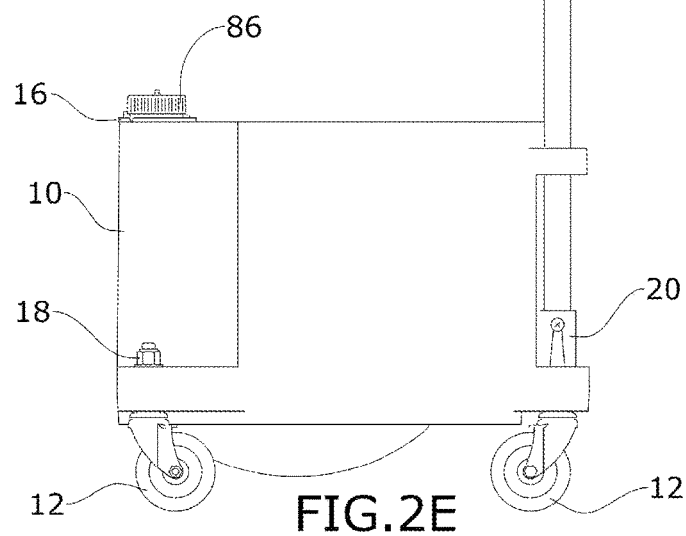

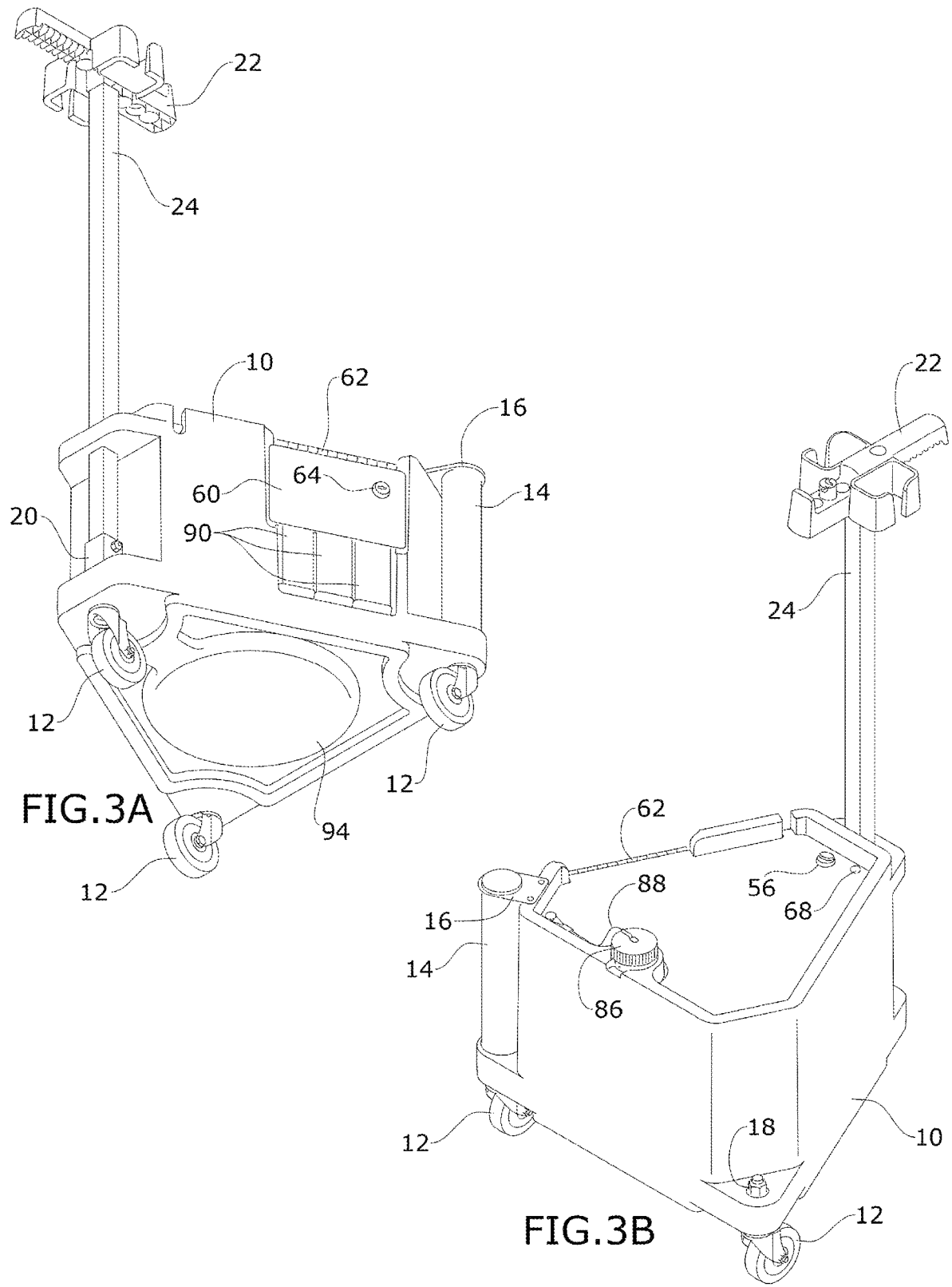

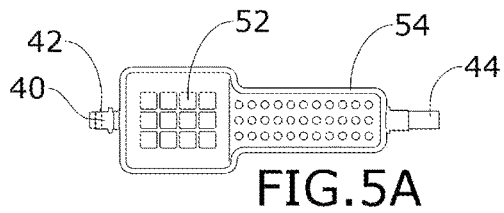
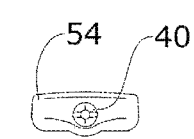
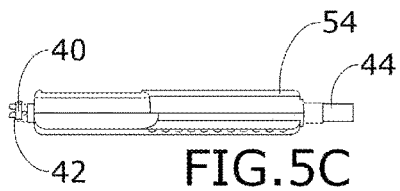
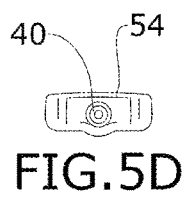
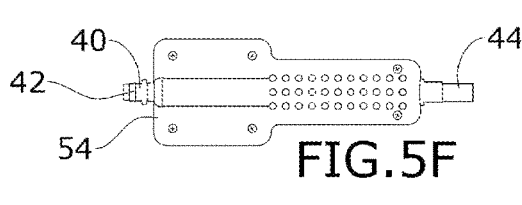
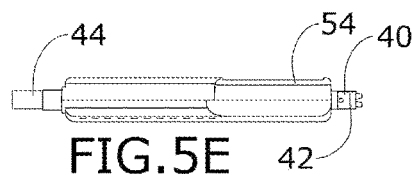
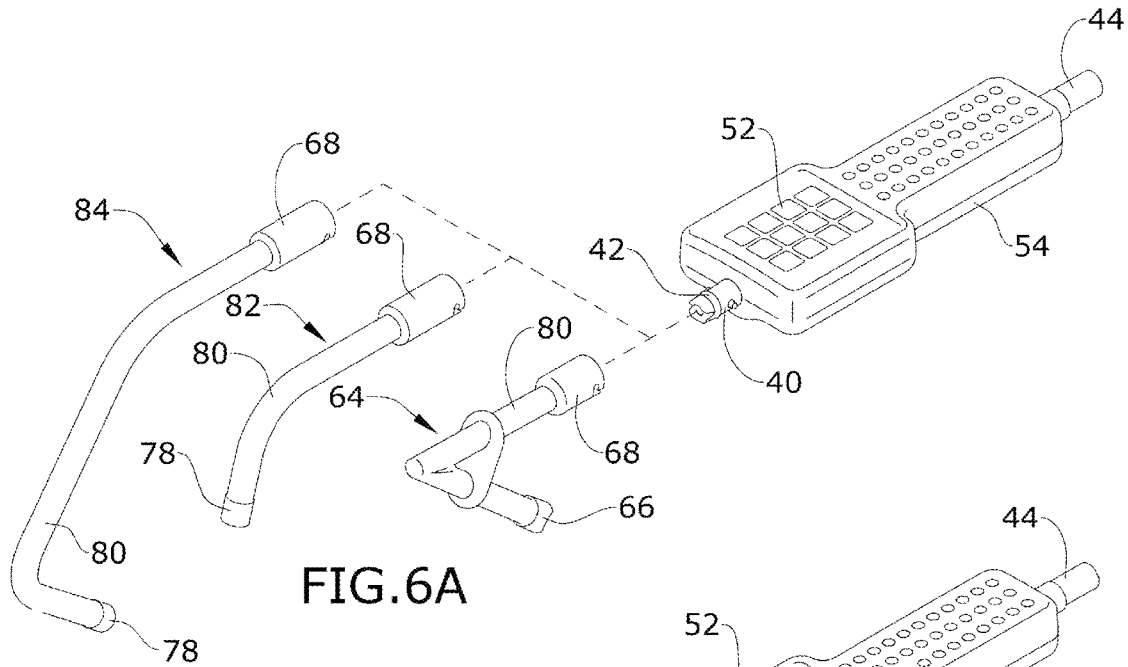
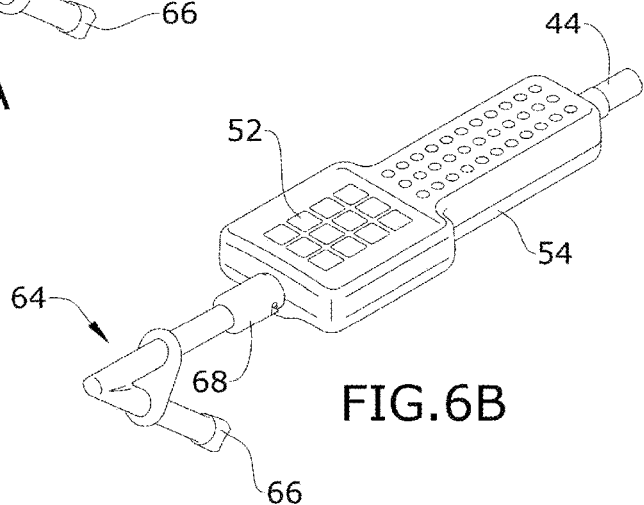

MOBILE AND INTERNET CONNECTED CLEANING CART

CLAIM OF BENEFIT TO PRIOR APPLICATION

This application claims benefit to U.S. Provisional Patent Application 63/226,576, entitled "An internet connected, mobile, formulator, dispenser, applicator, cleaning platform," filed Jul. 28, 2021. The U.S. Provisional Patent Application 63/226,576 is incorporated herein by reference.

BACKGROUND

Embodiments of the invention described in this specification relate generally to cleaning systems and devices, and more particularly, to a mobile and internet connected cleaning cart, specifically, a mobile and internet connected cleaning cart with devices and components that make the mobile and internet connected cleaning cart an internet connected, mobile, formulator, dispenser, applicator, cleaning platform.

Existing cleaning products used currently for daily cleaning of bathrooms, showers, restrooms, kitchen floors, and other surfaces is generally limited to only mops, buckets, and spray bottles. This results in a limited number of products; limited means of diluting and limited means to apply the products to surfaces. They must use ready to use products or previously diluted products. All components of the products must be compatible with one another and stable for long periods of time. There is no automatic documentation of work completed or supplies used.

There are two primary cleaning product devices used today. The first is the spray bottle which provides a very small amount of cleaning agent per trigger activation resulting in little cleaning capacity, limited soil removal, and high labor. Other associated problems are limited number of products and carpal tunnel from trigger activation. Mop buckets result in the reuse of dirty (used) solution over and over, limited agitation of the soil, and limited removal/pick up.

Therefore, what is needed is a way to provide a single all-in-one solution for cleaning that is mobile, computer-controlled, and capable of connecting wirelessly to the Internet, and which provides instant access to multiple different dilutions for cleaning and non-diluted water rinse along with a variety of several applicator tools.

A mobile and internet connected cleaning cart is disclosed. In some embodiments, the mobile and internet connected cleaning cart comprises devices and components that make the mobile and internet connected cleaning cart an internet connected, mobile, formulator, dispenser, applicator, cleaning platform. In some embodiments, the mobile and internet connected cleaning cart provides instant access to multiple different dilutions and non-diluted water rinse in a single all-in-one solution for cleaning with easy access to a variety of applicator tools. In some embodiments, the mobile and internet connected cleaning cart provides instant access to nine different dilutions and non-diluted water rinse. In some embodiments, the mobile and internet connected cleaning cart is connected to the Internet. In some embodiments, the mobile and internet connected cleaning cart is computer controlled so that more than one solution can be used simultaneously.

BRIEF DESCRIPTION

A novel mobile and internet connected cleaning cart is disclosed. In some embodiments, the mobile and internet connected cleaning cart comprises devices and components that make the mobile and internet connected cleaning cart an internet connected, mobile, formulator, dispenser, applicator, cleaning platform. In some embodiments, the mobile and internet connected cleaning cart is movable (mobile) by wheels or when carried by an operator. In some embodiments, the mobile and internet connected cleaning cart provides instant access to a plurality of different dilutions for cleaning and a non-diluted water rinse in a single all-in-one cleaning platform with easy access to a variety of applicator tools. In some embodiments, the plurality of different dilutions comprise nine different dilutions. In some embodiments, the mobile and internet connected cleaning cart is configured to connect to the Internet. In some embodiments, the mobile and internet connected cleaning cart is computer controlled so that more than one cleaning solution can be used simultaneously.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 2A conceptually illustrates a top view of the mobile and internet connected cleaning cart in some embodiments.

FIG. 2B conceptually illustrates a front view of the mobile and internet connected cleaning cart in some embodiments.

FIG. 2C conceptually illustrates a bottom view of the mobile and internet connected cleaning cart in some embodiments.

FIG. 2D conceptually illustrates a rear view of the mobile and internet connected cleaning cart in some embodiments.

FIG. 2E conceptually illustrates a left side view of the mobile and internet connected cleaning cart in some embodiments.

FIG. 3A conceptually illustrates a bottom perspective view of the mobile and internet connected cleaning cart with an alternate form of water reservoir in some embodiments.

FIG. 3B conceptually illustrates a rear perspective view of the mobile and internet connected cleaning cart in some embodiments.

FIG. 5A conceptually illustrates a top view of a wand keyboard of the mobile and internet connected cleaning cart in some embodiments.

FIG. 5B conceptually illustrates a frontal view of the wand keyboard in some embodiments.

FIG. 5C conceptually illustrates a left view of the wand keyboard in some embodiments.

FIG. 5D conceptually illustrates a rear view of the wand keyboard in some embodiments.

FIG. 5E conceptually illustrates a right view of the wand keyboard in some embodiments.

FIG. 5F conceptually illustrates a bottom view of the wand keyboard in some embodiments.

FIG. 6A conceptually illustrates an exploded view of the wand keyboard in some embodiments.

FIG. 6B conceptually illustrates a perspective view of the wand keyboard in some embodiments.

DETAILED DESCRIPTION

Figure 1A:
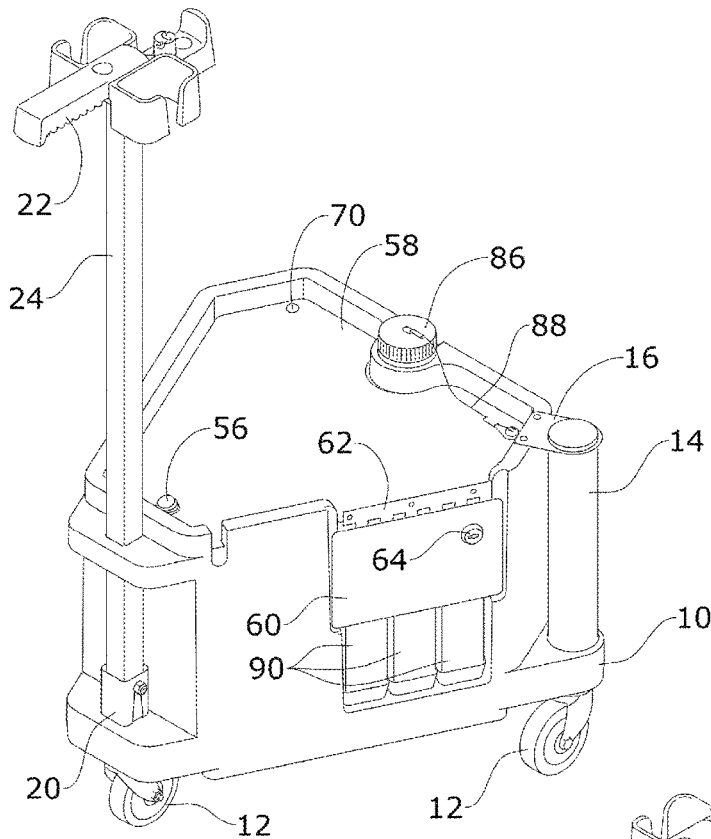
FIG. 1A conceptually illustrates a perspective view of a mobile and internet connected cleaning cart in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel mobile and internet connected cleaning cart. In some embodiments, the mobile and internet connected cleaning cart comprises devices and components that make the mobile and internet connected cleaning cart an internet connected, mobile, formulator, dispenser, applicator, cleaning platform. In some embodiments, the mobile and internet connected cleaning cart is movable (mobile) by wheels or when carried by an operator. In some embodiments, the mobile and internet connected cleaning cart provides instant access to a plurality of different dilutions for cleaning and a non-diluted water rinse in a single all-in-one cleaning platform with easy access to a variety of applicator tools. In some embodiments, the plurality of different dilutions comprise nine different dilutions. In some embodiments, the mobile and internet connected cleaning cart is configured to connect to the Internet. In some embodiments, the mobile and internet connected cleaning cart is computer controlled so that more than one cleaning solution can be used simultaneously.

As stated above, existing cleaning products used currently for daily cleaning of bathrooms, showers, restrooms, kitchen floors, and other surfaces is generally limited to only mops, buckets, and spray bottles. This results in a limited number of products; limited means of diluting and limited means to apply the products to surfaces. They must use ready to use products or previously diluted products. All components of the products must be compatible with one another and stable for long periods of time. There is no automatic documentation of work completed or supplies used. In particular, there are two primary cleaning product devices used today. The first is the spray bottle which provides a very small amount of cleaning agent per trigger activation resulting in little cleaning capacity, limited soil removal, and high labor. Other associated problems are limited number of products and carpal tunnel from trigger activation. Mop buckets result in the reuse of dirty (used) solution over and over, limited agitation of the soil, and limited removal/pick up. Embodiments of the mobile and internet connected cleaning cart described in this specification solve such problems by providing a single all-in-one cleaning platform that connects to the Internet and is computer controlled, with a variety of several applicator tools, and multiple dilutions and non-diluted water rinse available instantly for cleaning needs.

Embodiments of the mobile and internet connected cleaning cart described in this specification differ from and improve upon currently existing options. In particular, some embodiments of the mobile and internet connected cleaning cart improve on the current, existing cleaning products and devices by (i) using global positioning system (GPS) technology and internet connections to monitor use, (ii) using multiple, high-active, incompatible solutions (both simultaneously and at different times, according to cleaning needs) to reduce cost and improve performance, (iii) utilizing a disconnected mobile system to eliminate back flow and cross connection issues with wall mounted dilution devices, (iv) using very small output pumps for the concentrated solutions which allows for very low dilutions of extremely high concentration solutions, (v) using independent pumps and software to vary pump speeds and select which pumps are to run to create unlimited use solution with options, (vi) utilizing a built-in flat spray nozzle to provide consistent back pressure to assure very accurate dilutions with any application tool, (vii) using a multitude of additional application devices for a variety of applications, namely, (a) a special device for cleaning the inside of shower curtains and doors from the outside of the shower/door and (b) another special device that fills spray bottles without any foam, as well as including a timer which provides "hands off" filling of spray bottles which entirely fills the bottle without overflow and stops automatically, (viii) providing a programmable computer which can be programmed to switch products instantly or to stop instantly from the keyboard at the outlet, and (ix) providing a way for the computer to control the pumps continuously or in a batch method so the used solution is uniform or could provide a water flush at the end of every container filled.

Specifically, the mobile and internet connected cleaning cart described in this specification is designed to produce and use solutions from concentrates and water. Furthermore, the mobile and internet connected cleaning cart produces data than can be used to create reports detailing work done and/or to generate purchase orders as needed.

In comparison, existing mop buckets, spray bottles, and other sprayers or misters can only apply one diluted solution. As such, the existing cleaning products and cleaning product devices suffer from limited flexibility. Also, cleaning carts use aspirators, which renders them highly inflexible. Furthermore, none of the existing cleaning products and cleaning product devices provide or utilize a computer. This renders the existing options inflexible in other aspects, such as in record keeping, report generation, receipt and invoice creation, and communication capabilities. However, the mobile and internet connected cleaning cart is totally different from the existing cleaning products and cleaning product devices since it is configured to provide instant access to nine different dilutions and non-diluted water rinse, in addition to providing a variety of applicator tools. In this way, the mobile and internet connected cleaning cart of the present disclosure is capable of producing a stream of cleaning solution that can be placed into containers or applied onto surfaces and also being able to produce performance data that is useful to monitor activities and carry out other important functions or activities.

The mobile and internet connected cleaning cart of the present disclosure may be comprised of the following elements. This list of possible constituent elements is intended to be exemplary only and it is not intended that this list be used to limit the mobile and internet connected cleaning cart of the present application to just these elements. Persons having ordinary skill in the art relevant to the present disclosure may understand there to be equivalent elements that may be substituted within the present disclosure without changing the essential function or operation of the mobile and internet connected cleaning cart. Specifically, some embodiments of the mobile and internet connected cleaning cart comprise (i) casters, (ii) caster washers, (iii) caster lock nuts, (iv) a rotomold body, (v) a two inch (2") cap, (vi) a cap tether, (vii) a key lock with door latch, (viii) a door, (ix) a platform, (x) platform screws (or fasteners), (xi) a handle, (xii) a handle/holster for tool storage and/or bottle or hose storage, (xiii) a door hinge, (xiv) one or more solution bottles, (xv) a mop handle holder, (xvi) a power switch, (xvii) a handle screw, (xviii) a solution bottle cap for each solution bottle, (xix) a solution inlet tube for each solution bottle, (xx) (optional) embossed logos, (xxi) a lock nut, (xxii) a wand host opening, (xxiii) a battery, (xxiv) a tank sump, (xxv) a manifold, (xxvi) solution pumps, (xxvii) a water pump, (xxviii) a wiring trace, (xxix) a printed circuit board (PCB) space to hold a PCB-based control unit computing device, (xxx) water inlet tubing, (xxxi) a wand, (xxxii) a wand housing front, (xxxiii) a wand keyboard, (xxxiv) an assembled wand hose, (xxxv) a male quick connect, (xxxvi) a platform screw, (xxxvii) a wand housing back, (xxxviii) PVC pipe ¼, (xxxix) a female quick connect, (xxxx) a full cone nozzle, and (xxxxi) a filler head.

The various elements of the mobile and internet connected cleaning cart of the present disclosure may be related in the following exemplary fashion. It is not intended to limit the scope or nature of the relationships between the various elements and the following examples are presented as illustrative examples only.

By way of example, FIG. 1A conceptually illustrates a perspective view of the mobile and internet connected cleaning cart. As shown in this figure, the mobile and internet connected cleaning cart comprises a rotomold body 10, casters 14, a mop handle holder 12, a holder bracket 16, a bottom cap for handle extrusion 20, a handle/holster 22, a handle extrusion 24, a power switch 56, a platform 58, a door 60 to a solution cabinet, a hinge 62, a key lock 64, a platform fastener 70, a tank cap 86, a cap tether 88, and solution bottles 90.

The rotomold body 10 serves as a frame and a water reservoir (or "water tank") for the mobile and internet connected cleaning cart. Also, the rotomold body 10 has a tank sump built in to allow the water reservoir to be emptied completely from water inlet tubing. In some embodiments, the water reservoir size is sufficient to store six gallons of liquid. The water tank may vary in size to hold more or less liquid (water) than six gallons. However, the size of the water tank may impact an overall size of the mobile and internet connected cleaning cart, and by consequence, the size of the rotomold body 10. While different sizes are possible, for purposes of describing the exemplary drawing figures, the water tank may be considered as capable of holding up to six gallons of water (a six-gallon water tank).

On the top of the rotomold body 10 is the platform 58 which provides a lid for the rotomold body 10. The platform 58 is flat and, therefore, provides a work surface. The platform 58 is attached to the rotomold body 10 using multiple platform fasteners 70 (only one platform fastener 70 shown in this figure), such as screws. In some embodiments, the platform 58 is attached to the rotomold body 10 by three platform fasteners 70. In addition, the platform 58 forms the top of pockets for functional parts of the mobile and internet connected cleaning cart underneath the platform 58. Additional features may be added by injection molding underneath the platform 58.

In some embodiments, the power switch 56 is mounted in the platform 58 and controls the operational power of the mobile and internet connected cleaning cart. The hinge 62 is also attached to the platform 58. The door 60, in turn, is attached to the hinge 62. The key lock 64 is mounted on door 60. The solution bottles 90 are shown in the solution cabinet behind and under the door 60, which is shown in this figure to be in a locked configuration via key lock 64. Thus, the mobile and internet connected cleaning cart shown in this figure is assembled in a way that allows a bottle storage area (or rather, the solution cabinet) to be locked in order to secure the solution bottles 90 in place.

In addition, the mobile and internet connected cleaning cart provides access to the water reservoir through the tank cap 86, which opens up to provide access into the water tank and closes off the water tank as needed. In some embodiments, the tank cap 86 is a two inch (2") cap. Also, the tank cap 86 is tethered to the platform 58 with the cap tether 88. In this way, if the tank cap 86 is removed, it is not going to be misplaced or lost, since the cap tether 88 attaches to the platform 58.

The casters 12 are attached to the rotomold body 10. In this way, the mobile and internet connected cleaning cart is movable by pushing or pulling the cart. Typically, an operator or user can push or pull the cart by taking grip of the handle extrusion 24. The handle extrusion 24 is attached to the rotomold body 10 through a square hole in the rotomold body 10 and attached at the bottom with the bottom cap for handle extrusion 20. The bottom cap for handle extrusion 20 may secure the handle extrusion 24 by way of a handle screw and a lock nut, for instance, or another type of fastening mechanism. The handle extrusion 24 can be released from the bottom cap for handle extrusion 20 and removed from the mobile and internet connected cleaning cart as needed (e.g., for storage or transport). The handle/holster 22 is attached to the top of the handle extrusion 24. The handle/holster 22 provides tool storage and can be used as a handle. For example, a keyboard/keypad wand, hoses, and other tools can be secured to the handle/holster 22 as needed.

Additionally, the mop handle holder 14 is attached to the rotomold body 10 by the holder bracket 16. The mop handle holder 14 provides a storage place for a mop handle in an upright (but upside-down) orientation with the head of the mop positioned in the air, above the holder bracket 16 and mop handle holder 14. Also, the sides of the rotomold body 10 are built for mounting items like a mop handle, a wet vacuum, and/or a utility cart, via grooves, holders, hitches, etc.

Figure 1B:
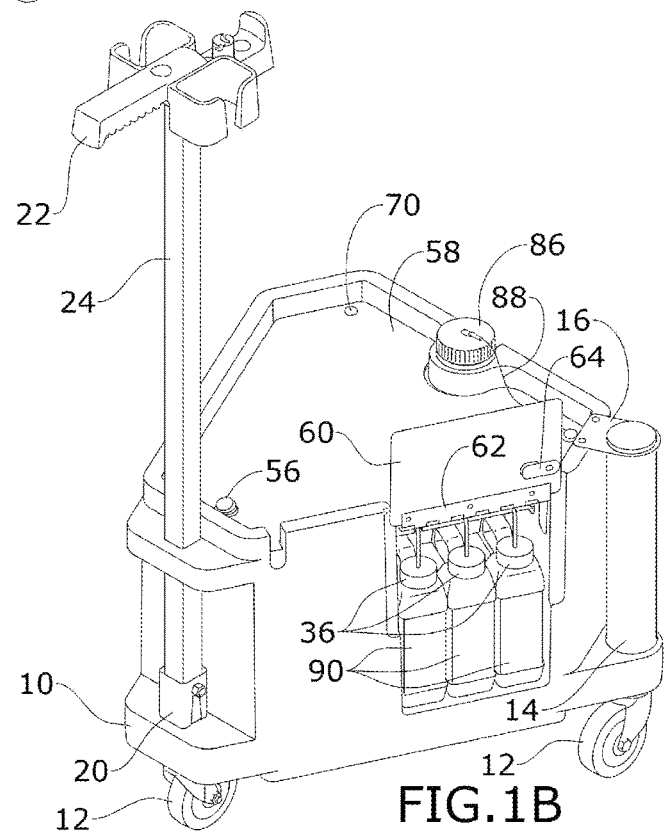
FIG. 1B conceptually illustrates a perspective view of the mobile and internet connected cleaning cart with the door of the cart open in some embodiments.

A perspective view of the mobile and internet connected cleaning cart conceptually illustrated in FIG. 1B shows the door 60 of the cart open. In this figure, the door 60 opens up along the hinge 62, which exposes the solution cabinet and reveals bottle caps 36 covering the solution bottles 90 with solution inlet tubing attached to the top of each bottle cap 36. With the door 60 is open, bottle caps 36 can be removed from the solution bottles 90. Similarly, the solution bottles 90 can be removed from the solution cabinet when the door 60 is open. In this way, the solution in each solution bottle 90 can be replaced or swapped out as needed. When the door 60 to the solution cabinet is closed and locked via the key lock 64, the solution bottles 90 stay securely in place.

Figure 2F:
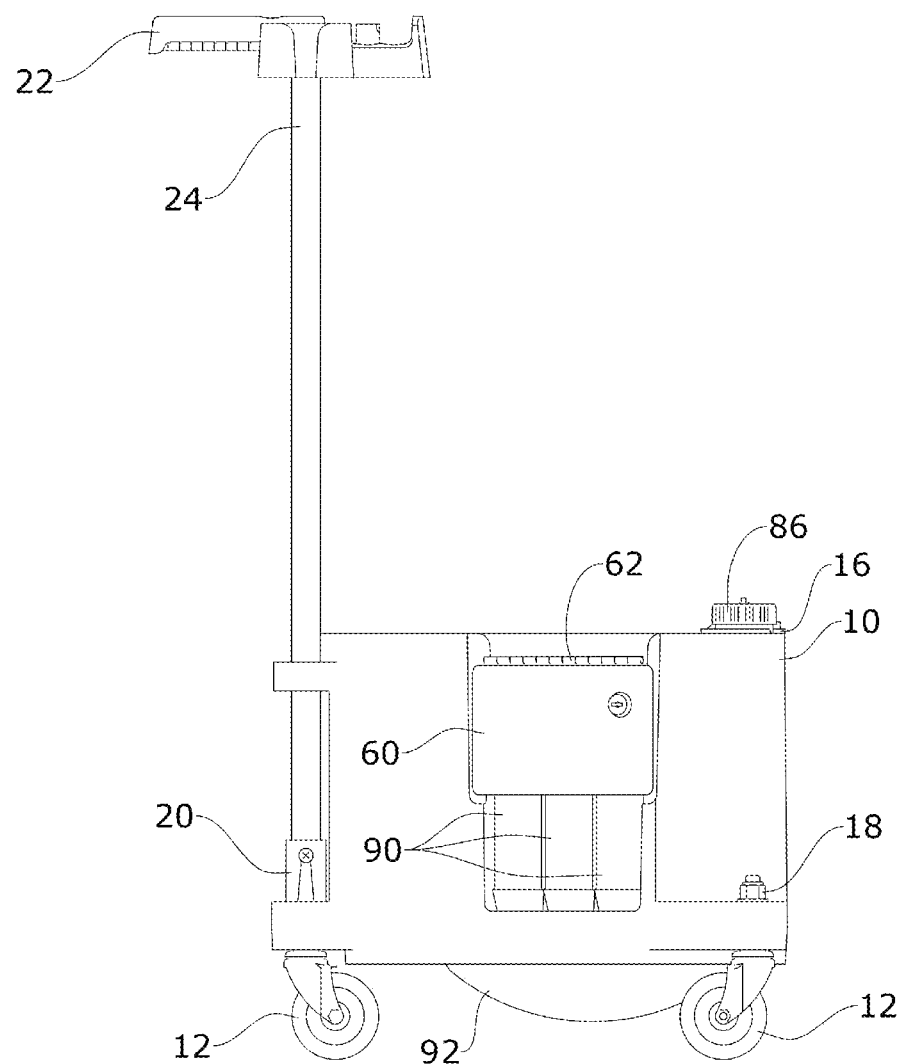
FIG. 2F conceptually illustrates a right side view of the mobile and internet connected cleaning cart in some embodiments.

Turning to other examples, FIGS. 2A-2F demonstrate the mobile and internet connected cleaning cart from several different viewpoints. Specifically, FIG. 2A conceptually illustrates a top view of the mobile and internet connected cleaning cart. From this top view, lock nuts 18 and a barrel connector 68 are shown to be included in the mobile and internet connected cleaning cart. The lock nuts 18 each comprise a lock nut and washer. The lock nuts 18 are used to attach the casters 12 to the rotomold body 10. The barrel connector 68 is used for charging the mobile and internet connected cleaning cart. Specifically, the mobile and internet connected cleaning cart uses a wall charger and the barrel connector 68 is for charging at a low voltage (e.g., 14 volts). Similarly, FIG. 2B conceptually illustrates a front view of the mobile and internet connected cleaning cart. In this front view, three casters 12 and a tank sump 92 are visible under the rotomold body 10 and one of the lock nuts 18 is shown above the rotomold body 10. The lock nut 18 protrudes through the rotomold body 10 to securely attach to the caster 12 below it. Now turning to FIG. 2C, a bottom view of the mobile and internet connected cleaning cart is shown in which the three casters 12 and the tank sump 92 are visible along the bottom of the rotomold body 10 and a portion of the handle/holster 22 is also shown. FIG. 2D conceptually illustrates a rear view of the mobile and internet connected cleaning cart showing two of the casters 12 at the rear and one of the casters 12 at the front of the mobile and internet connected cleaning cart. Also, one of the lock nuts 18 that connects to one of the rear casters 12 is shown above the rotomold body 10. Another lock nut 18 that attaches the other rear caster 12 is not visible as it is positioned within a hollowed out portion of the mop handle holder 14. FIG. 2E conceptually illustrates a left side view of the mobile and internet connected cleaning cart in which the rotomold body 10 is flat surface as compared to the rotomold body 10 shown in FIG. 2F. Specifically, FIG. 2F conceptually illustrates a right side view of the mobile and internet connected cleaning cart. Here, the solution bottles 90, the door 60 to the solution cabinet, and the hinge 62 are shown along the rotomold body 10, with the tank sump 92 below and toward the rear of the cart. Note that different forms or shapes for the tank sump 92 are supported. This is described next, by reference to FIG. 3A.

Specifically, FIG. 3A conceptually illustrates a bottom perspective view of the mobile and internet connected cleaning cart with an alternate form of sump tank. As shown in this figure, the mobile and internet connected cleaning cart is configured to utilize the alternate form of sump tank 94 that has a flatter bottom. Being flat at the bottom, the alternate form of sump tank 94 does not bulge out as much as the tank sump 92 described above, by reference to FIG. 2B. Thus, the alternate form of sump tank 94 provides additional clearance for the mobile and internet connected cleaning cart. Turning to another example, FIG. 3B conceptually illustrates a rear perspective view of the mobile and internet connected cleaning cart. While neither the tank sump 92 nor the alternate form of sump tank 94 are shown in this figure, it is noted that the mobile and internet connected cleaning cart can be adapted to support either one.

As described above, the platform 58 is a lid that provides a work surface. However, the platform 58 can be removed to expose internal components of the mobile and internet connected cleaning cart. This is described next, by reference to FIGS. 4A-4B.

Figure 4A:
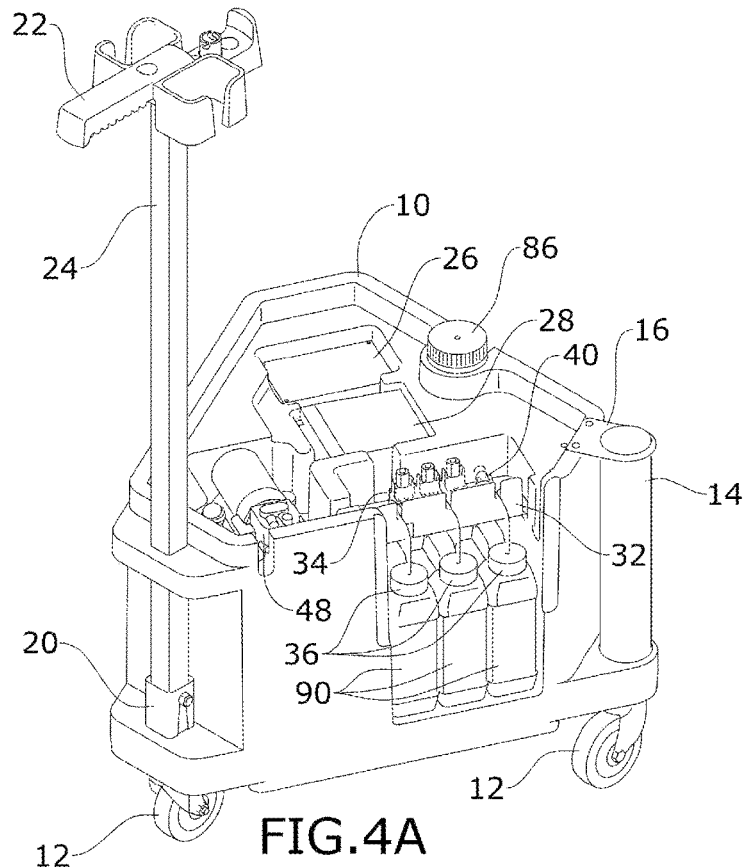
FIG. 4A conceptually illustrates a perspective view of the mobile and internet connected cleaning cart shown without the platform and door in some embodiments.
Figure 4B:
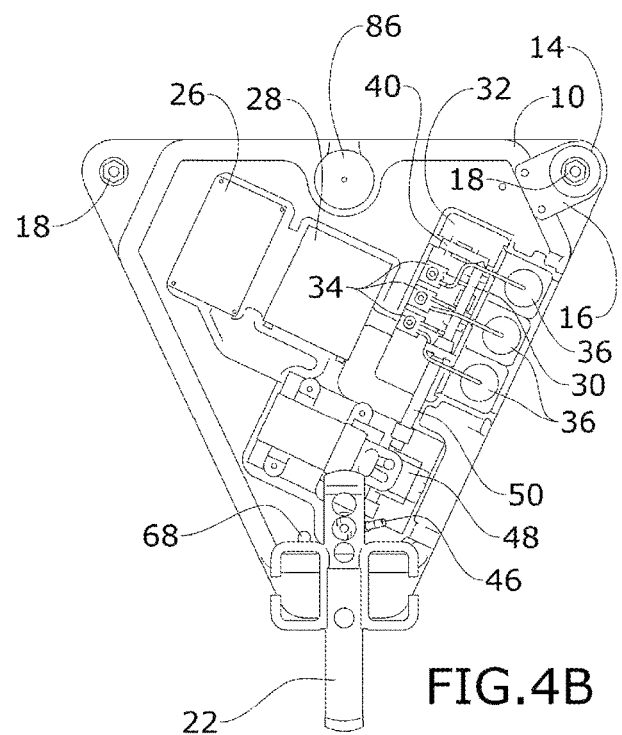
FIG. 4B conceptually illustrates a top view of the mobile and internet connected cleaning cart shown without the platform and door in some embodiments.

Specifically, FIG. 4A conceptually illustrates a perspective view of the mobile and internet connected cleaning cart shown without the platform 58 and door 60. In particular, the mobile and internet connected cleaning cart shown in this figure shows several additional components when the platform 58 is removed including a control unit 26, a battery 28, a chassis 32, pumps 34, a bayonet/flat spray nozzle 40, and a water pump 48. Some additional components are shown in FIG. 4B, which conceptually illustrates a top view of the mobile and internet connected cleaning cart shown without the platform and door. With the platform 58 removed, the mobile and internet connected cleaning cart shown from this top view reveals the control unit 26, the battery 28, the chassis 32, three pumps 34 for the three solution bottles 90, the bayonet/flat spray nozzle 40, and the water pump 48, as well as a manifold 30, an elbow 46, and tubing 50

The solutions are stored in the solution bottles 90. With the door 60 removed in these view, it is possible to see how the solutions are drawn up through the solution inlet tubes past the solution bottle caps 36 by the pumps 34 and into the manifold 30 where the solutions are mixed with other solutions and water at precise ratios. The tank sump 92 (or sump tank 94, built in to the rotomold body 10) allows the water tanks to be emptied completely from the water inlet tubing. Specifically, the water is drawn into and through the manifold 30 by the water pump 48 and through a wand hose (not shown in FIGS. 4A-4B). In some embodiments, the wand hose comprises a six-foot assembled wand hose. An example of a wand hose is described below, by reference to FIG. 8.

The mobile and internet connected cleaning cart and several of its components are powered by the battery 28 and controlled by the control unit 26. In some embodiments, the control unit 26 comprises a printed circuit board (PCB). In some embodiments, the PCB of the control unit 26 comprises an Arduino single board computer (SBC). The control unit 26, or the PCB and Arduino, is configured to use voltage regulators, PWM timers, and software to control the pumps 34. The control unit 26, or the PCB and Arduino (hereinafter referred to as the "PCB/Arduino control unit 26"), is also configured to store usage data with location data (obtained by an onboard global position system (GPS) device or chip) and time data (obtained by internal clock and embedded software that runs on one or more processing units of the PCB/Arduino control unit 26), and to transmit the usage data, location data, and time data wirelessly to an external service configured to receive the data.

Specifically, the PCB/Arduino control unit 26 of some embodiments comprises one or more voltage regulators, one or more processing units (also referred to as a "processor") capable of running programs, embedded software, applications, and routines to create the different product formulations and different pulse-width-modulation (PWM) signals to control pump speeds while operating and controlling the mobile and internet connected cleaning cart. Specifically, the PWM signals control transistor circuits that convert the low power signals to sufficient power to run pumps.

In some embodiments, the PCB/Arduino control unit 26 collects data including which key was pressed, location (via GPS), time, and date. This data can then be wirelessly uploaded to external devices, programs, and/or services and used for several related aspects, including (without limitation):
1. Platform device quality assurance (QA)
2. Inventory control
3. Cleaning QA
4. Control workflow
5. And other functions The mobile and internet connected cleaning cart of the present disclosure generally works by diluting concentrates into a water stream by the mobile and internet connected cleaning cart. In this way, the mobile and internet connected cleaning cart is both a dispenser and an applicator. First, the mobile and internet connected cleaning cart is configured to move positions by way of rolling, via casters 12, and/or by hand lifting and carrying or transporting in a vehicle and is therefore mobile. The mobile and internet connected cleaning cart is very compact on a three-wheel triangle base to maximize mobility in tight areas such as toilet stalls. The concentrate pumps are extremely small (1-8 ml per minute), and the concentrate containers are also small (500 ml). The concentrates are pumped into the manifold 30 on the inlet side of the pump to minimize back pressure on the pumps. Since the user will change from one product to another often, the amount of liquid that must be flushed is minimized at about two ounces of fluid or two seconds of flushing time.

To minimize size, the mobile and internet connected cleaning cart has little dead space. The functional parts of the mobile and internet connected cleaning cart, such as the battery 28, the PCB/Arduino control unit 26, the pumps 34, and wiring are all form-fitted into pockets built into the rotomold body 10. This also simplifies assembly of the mobile and internet connected cleaning cart and repair of its components (individually) or repair of the overall mobile and internet connected cleaning cart. While other existing mobile systems or devices, such as pressure washers, use large valves and pressure switches to operate, the mobile and internet connected cleaning cart of the present disclosure has no valve. By contrast, the mobile and internet connected cleaning cart is operated simply by applying voltage to different pumps. Each pump mechanism acts as a check valve for the mobile and internet connected cleaning cart.

Other than the power switch 56, the entire operation of the mobile and internet connected cleaning cart is done at a wand keyboard. Specifically, the entire operation of the mobile and internet connected cleaning cart is controlled by a 12-key keyboard of the wand keyboard that is connected to the PCB/Arduino control unit 26 by a seven-wire harness. Furthermore, all product selections are completed by keystroke interactions with the 12-key keyboard of the wand keyboard and the different tools of the mobile and internet connected cleaning cart are easily switched at the wand keyboard, thereby providing quite different fluid properties. Examples of the wand keyboard used to control features of the mobile and internet connected cleaning cart are described next, by reference to FIGS. 5A-5F, 6A-6B, and 7A-7B. In some embodiments, the wand keyboard includes a wand outlet that is a bayonet style quick connect with a built-in flat spray nozzle that provides (i) a means to attach other tools, (ii) an excellent high pressure applicator tool with no other tool attached, and (iii) a small reproducible orifice to control back pressure against the water pump.

By way of a wand keyboard example, FIG. 5A conceptually illustrates a top view of a wand keyboard device of the mobile and internet connected cleaning cart, FIG. 5B conceptually illustrates a frontal view of the wand keyboard device, FIG. 5C conceptually illustrates a left view of the wand keyboard device, FIG. 5D conceptually illustrates a rear view of the wand keyboard device, FIG. 5E conceptually illustrates a right view of the wand keyboard device, and FIG. 5F conceptually illustrates a bottom view of the wand keyboard device. As shown in these figures, the wand keyboard device comprises a bayonet/flat spray nozzle 40, an O-ring 42 (where the bayonet/flat spray nozzle 40 and the O-ring 42 together make up a male quick connect), a hose assembly 44, a 12-key wand keyboard 52, and a wand keyboard device housing 54. The wand keyboard device housing 54 comprises a wand housing front and a wand housing back. The wand keyboard device is assembled with the 12-key wand keyboard 52 attached to the wand housing front. The 12-key wand keyboard 52 connects to the PCB/Arduino control unit 26 by way of the seven-wire harness in the assembled hosing assembly 44 of the wand keyboard device, the male quick connect is connected to a quarter inch (¼ inch) tube that is also part of the assembled wand hose and connects to the water pump 48. The male quick connect incorporates the bayonet/flat spray nozzle 40, which is useful for applying solution and represents the smallest orifice in the solution conduit so other tools can be attached without affecting back-pressure, so dilutions are consistent with a number of tools.

Now, turning to other views of the wand keyboard device, FIG. 6A conceptually illustrates an exploded view of different application tools that connect to the wand keyboard device and FIG. 6B conceptually illustrates a perspective view of an application tool connecting to the wand keyboard device. As shown in these figures, the wand keyboard device comprises three additional application tools beyond the components of the wand keyboard device proper (i.e., the bayonet/flat spray nozzle 40, the O-ring 42, the hose assembly 44, the 12-key wand keyboard 52, and the wand keyboard device housing 54). The three additional application tools comprise a shower cleaner tool 84 (also referred to as the first application tool), a cone spray tool 82 (also referred to as the second application tool), and a container filler tool 64 (also referred to as the third application tool). Each application tool has a female quick connect barrel connector 68 (referred to as either the "female quick connect" or the barrel connector") and a PVC pipe ¼ inch 80 (hereinafter referred to as the "PVC pipe 80") which is cut and formed for a specific function. The first application tool (i.e., the shower cleaner tool 84) comprises two 45-60 degree bends in the PVC pipe 80 and a solid cone nozzle 78 constructed to provide a gentle conical spray. As such, the shower cleaner tool 84 is useful for applying use solution to the inside of areas, such as showers, while the device and operator are on the outside. For example, the shower cleaner tool 84 allows spraying of all surfaces inside a shower with door closed standing outside the shower. The second tool (i.e., the cone spray tool 82) comprises a single 45-60-degree bend in the PVC pipe 80 and a solid cone nozzle 78 which makes the cone spray tool 82 useful for applying in a gentle manner covering large spaces. For example, the cone spray tool 82 is configured to provide cone spray used for urinals, toilets, counters. and equipment. The third application tool (i.e., the container filler tool 64) comprises a 120-180-degree bend and a filler head 66 which is an end piece on the container filler that turns the flow horizontal. The container filler tool 64 is an injection molded container filler. The container filler tool 64 is used to pump use solution into containers, such as spray bottles. In particular, the container filler tool 64 turns the flow ninety degrees and creates a laminar flow that gently runs down the side of the container, making the flow horizontal circling around the bottle, thereby eliminating splashing and foaming to create a foam-free container fill. With time data processing by the embedded software of the PCB/Arduino control unit 26 (and/or via timer information from the internal clock of the PCB/Arduino control unit 26), the solution bottles 90 will fill hands-free to the same level each time. Also, as shown in FIG. 6B, the female quick connect of the container filler tool 64 application tool connects easily to the male quick connect of the wand keyboard device.

The purpose of the mobile and internet connected cleaning cart is to dilute concentrates and water in different proportions so that many use dilutions are available. The mobile and internet connected cleaning cart of some embodiments has a wand keyboard device with twelve keys and provides nine different use solutions, a water only selection, and a stop function. These functions are obtained by providing electricity to the different pumps from different regulators with different PWM settings applied. This allows the water pump to run at any speed from ¼ to 1 GPM and the solution pumps to run from 1-8 ml per minute.

The software cycles through logical tests to determine whether a key has been activated and then does a subroutine for that key to run pumps at the programmed power settings until another key is pushed or the timer shuts down the sub-routine. Every time a key is activated, the data is stored as key activated, time and location. This allows a total log of actions and operations for the mobile and internet connected cleaning cart.

The user has a twelve key keyboard on the wand keyboard device. The twelve key keyboard is used to select which solution to make. When a key is pressed the computer goes through programmatic instructions and subroutines to make the desired solution/product and shut off when the timer subroutine is completed. The use data is stored (and saved locally in a database until connection to the Internet is available, if or whenever disconnected) and another subroutine is used to upload the information over the Internet to a cloud application service and cloud database for analysis by the cloud application service.

Figure 7A:
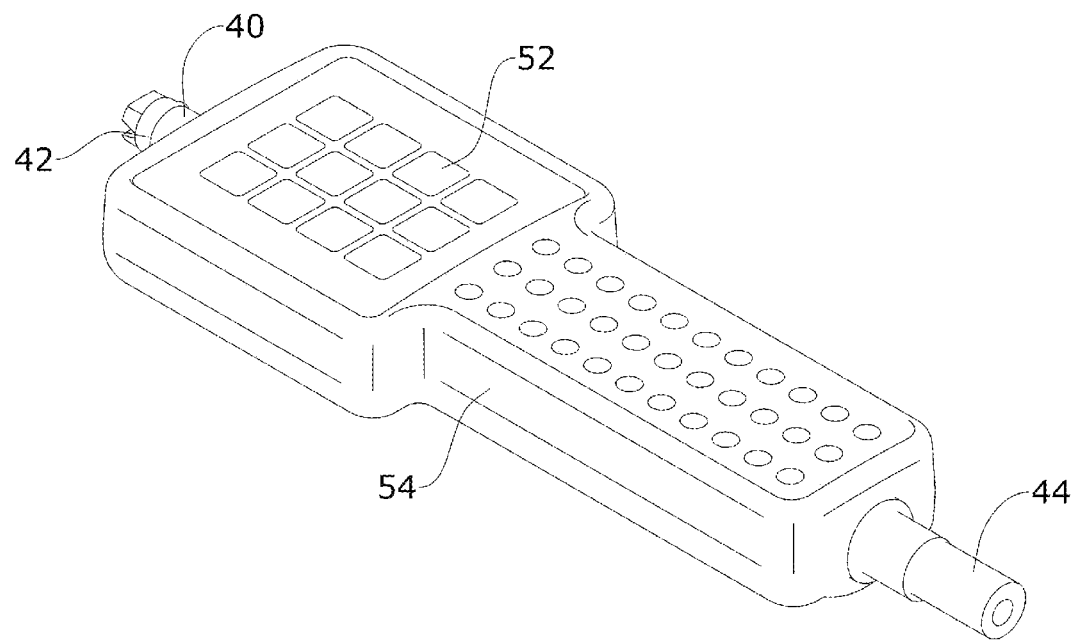
FIG. 7A conceptually illustrates a right side perspective view of the wand keyboard in some embodiments.
Figure 7B:
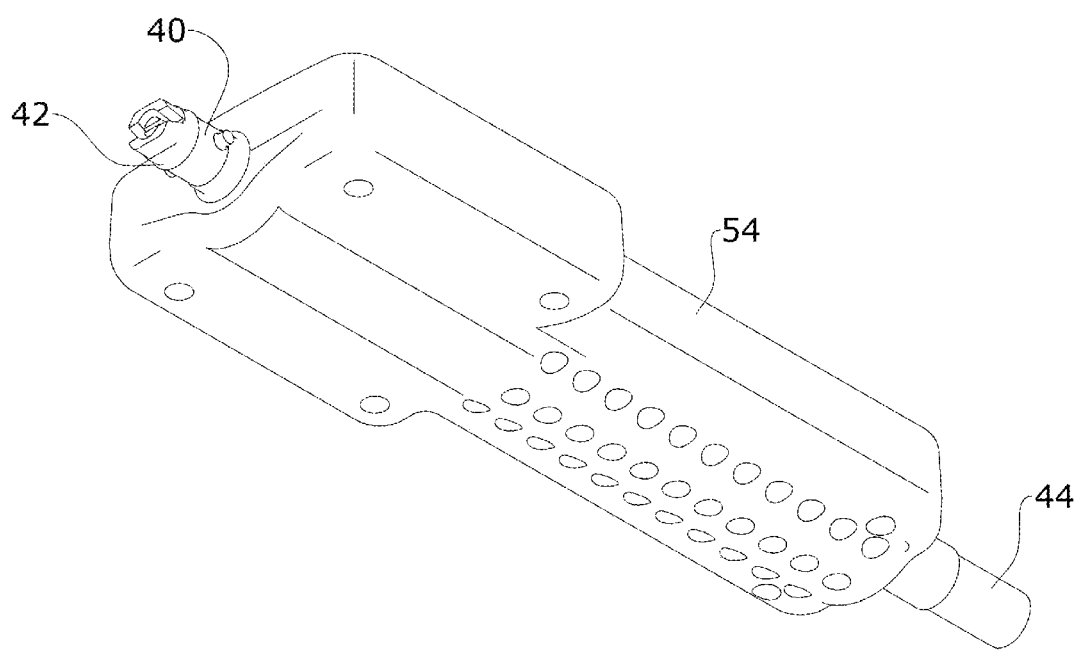
FIG. 7B conceptually illustrates a bottom perspective view of the wand keyboard in some embodiments.

Rounding out the examples of the wand keyboard device of the mobile and internet connected cleaning cart, FIG. 7A conceptually illustrates a top perspective view of the wand keyboard device with the bayonet/flat spray nozzle 40, the O-ring 42, the hose assembly 44, the 12-key wand keyboard 52, and the wand keyboard device housing 54. Similarly, FIG. 7B conceptually illustrates a bottom perspective view of the wand keyboard with the bayonet/flat spray nozzle 40, the O-ring 42, the hose assembly 44, the 12-key wand keyboard 52, and the wand keyboard device housing 54.

In some embodiments, the concentrates are mixed by the mobile and internet connected cleaning cart just prior to application. Therefore, there is a chance they can be incompatible. For example, using components that would not dissolve together as a concentrate without the need for stabilizers. Another example would be components that would not be stable together in storage but enhance performance while in use. For instance, using hydrogen peroxide in a stabilized form in one concentrate and then adding an activator, such as sodium carbonate, into the manifold from another concentrate. This would cause enhanced bleaching, deodorizing, and antimicrobial action not possible any other way.

To make the mobile and internet connected cleaning cart of the present disclosure, a person may start by designing a rotomold tool that incorporates the means for attaching the casters, handle, and platform. The rotomold parts would essentially be the frame while also holding water and providing pockets on the top for the functional parts such as pumps, battery, and PCB. The caster attachments and handle attachment utilize pass through openings in the rotomold that allow the casters and handle to be very securely fastened to the rotomold in a simple manner. In some embodiments, the mobile and internet connected cleaning cart itself has a low profile and flat top, making it a mobile work surface. In some embodiments, the sides of the rotomold body 10 are built for mounting items like the mop handle holder 14 or to hitch to other devices like wet vacuums or utility carts.

In some embodiments, the top of the rotomold would include pockets that would be capable of holding the solution containers, pumps, manifold, battery, and PCB. There would be opening between the pockets strategically designed for connecting tubes and wires. The design would need to minimize parts and length and volume of the fluid path.

In some embodiments, the mobile and internet connected cleaning cart may include a proprietary PCB that controls the pumps, stores data, and wirelessly transmits the data to other computers and connected devices.

In some embodiments, the assembled wand hose may carry seven wires to transmit keystroke instructions and a quarter inch (¼ inch) ID tube to convey the use solution. In some embodiments, these items would be covered by a suitable shield such as a braided fiber cover or a polymer cover such as rubber or urethane.

In some embodiments, the wand keyboard device is equipped with both the wand keyboard 52 and the use solution outlet. The use solution outlet needs to provide all three functions noted previously-spray, quick connection, and minimum orifice definition.

In some embodiments, the mobile and internet connected cleaning cart is designed as a movable, mobile (either by wheeled movement via casters, or handheld lifting and transporting) and internet connected cleaning cart with functions for cleaning as an all-in-one solution. In some embodiments, the mobile and internet connected cleaning cart includes a pump for the water and each concentrate. However, in some other embodiments, the mobile and internet connected cleaning cart includes only a limited number of concentrates. For example, the mobile and internet connected cleaning cart may be designed to support only one or two concentrates. In other designs, the mobile and internet connected cleaning cart is built to support as many concentrates as can fit into a platform mobile cart. Furthermore, in still other embodiments of the mobile and internet connected cleaning cart, data collection and transmission is not performed as a primary function and/or not supported. However, for embodiments of the mobile and internet connected cleaning cart in which data collection and transmission is supported and performed, the data transmission is typically performed by wireless means. Furthermore, the mobile and internet connected cleaning cart of some embodiments is equipped with an Ethernet port and corresponding internal wiring, thereby allowing the mobile and internet connected cleaning cart to be connected to internal or external networks (e.g., the Internet) by physical, hard-wired Ethernet cables.

Also, the mobile and internet connected cleaning cart of some embodiments stores the data in basic binary form that is machine readable and ideal for wireless transmission. Additionally, the mobile and internet connected cleaning cart of some embodiments comprises a multi-processor computing device (either PCB with multiple processors or SBC with multiple processor or multiple cores of a multi-processor) that is configured to support greater computing capabilities so it can create usable outputs or show them on a mounted screen. The data could be available with a plug in device such as a smartphone.

In some embodiments, the mobile and internet connected cleaning cart comprises three caster wheels. In some other embodiments, the mobile and internet connected cleaning cart comprises more than three wheels. In some other embodiments, the mobile and internet connected cleaning cart has no wheels and is designed to be hand carried.

In some embodiments, a triangle shape is utilized for design of the rotomold body 10. In some scenarios, the triangle shape may be optimum. As such, the mobile and internet connected cleaning cart of some embodiments attach the three caster wheels to corners of a triangular bottom surface of the rotomold body 10. In some other embodiments, the mobile and internet connected cleaning cart is designed with a shape that is not a triangle.

In some embodiments, a rotomold forming method is utilized to design the mobile and internet connected cleaning cart. However, the mobile and internet connected cleaning cart can be designed by other forming methods including, without limitation, metal forming, injection molding, extrusion, blow molding, and others, or combinations those or others.

In some embodiments, the concentrate pumps (also referred to as "solution pumps" or, simply, "pumps") are on the inlet side of the water pump but could be on the outlet if they can handle the increased back pressure. Virtually any pump type could be used. The concentrates (or solutions) are contained in 500 ml blow molded bottles (solution bottles 90) but could be contained in bags, other container types or refillable reservoirs. The size of the containers/solution bottles could vary depending on the requirements of the mobile and internet connected cleaning cart, but typical solution bottle/container sizes range from four to sixty-four ounces.

In some embodiments, the mobile and internet connected cleaning cart can be adapted and reconfigured in any of several different ways. As such, there are many ways the mobile and internet connected cleaning cart could be made but which still enables the mobile and internet connected cleaning cart to perform the same or similar cleaning functions. Also, the concentrates or solutions could be injected after the water pump, if the concentrate pumps (or solution pumps) could operate under the increased back pressure.

Additionally, the concentrates could be packaged in many ways. In a preferred embodiment of the mobile and internet connected cleaning cart, the concentrates/solutions are packaged at a volume of approximately 500 ml. However, the volume could range from 100 ml to 2000 ml. Also, the water storage is in an enclosed tank and has a capacity of approximately six gallons. The water tank could be open, or it could have any capacity from as small as one quart to as large as thirty-five gallons. The package could be in another form such as a bag and could be mounted in any orientation.

In some embodiments, the hose can be any length from approximately two feet for handheld units to as long as fifteen feet or more. In some embodiments, a hose of approximately five feet in length is preferred and the wand keyboard device connects to the PCB through the hose with the seven wire harness. In some embodiments, the wand keyboard device connects wirelessly to the PCB. In some other embodiments, less than seven wires are used to connect the wand keyboard device to the PCB. In some other embodiments, more than seven wires are used to connect the wand keyboard device to the PCB. In some embodiments, the number of wires utilized to connect the wand keyboard device to the PCB depends on the capabilities of the keyboard control.

In some embodiments, the mobile and internet connected cleaning cart has three wheels in triangular form and the wheels are configured to be attached and removed as desired by a user. In this way, the user can attach the wheels to push and/or pull the mobile and internet connected cleaning cart. On the other hand, the user can remove the wheels to lift the mobile and internet connected cleaning cart manually for transport (e.g., by walking while carrying the mobile and internet connected cleaning cart or by vehicle transport). While the mobile and internet connected cleaning cart is preferred to have three wheels in a triangle shape, the mobile and internet connected cleaning cart can be designed to have as few as zero wheel and as many as six wheels. Additionally, the mobile and internet connected cleaning cart can be attached or mounted on other devices such as a wet vacuum or cart. Moreover, the mobile and internet connected cleaning cart can be designed to operate as a self-propelled unit with a mechanical arm instead of the hose so it could be programmed to do the applications automatically with no human present. In this way, the mobile and internet connected cleaning cart can operate as an effective "smart" mobile and internet connected cleaning cart.

To use the mobile and internet connected cleaning cart of the present disclosure, an operator (or user) would bring it to a typical hotel room, nursing home, hospital, or other location. Note that currently, personal showers in typical hotel rooms, nursing homes, hospitals, and other such locations, are cleaned using a spray bottle only. To adequately clean and sanitize the entire shower including the curtain/door, the cleaner would need to actuate the spray bottle at least one hundred times. This would take at least five minutes. This is rarely done. Generally, showers are not cleaned well and not sanitized at all. However, with the mobile and internet connected cleaning cart of the present disclosure, the cleaner would reach the shower cleaner tool over the top of the curtain rod or door and push the restroom cleaner key. This cleaning by the mobile and internet connected cleaning cart would take about ten seconds to totally cover the entire surface of the shower and curtain. Then, a long handled tool (such as the cone spray tool 82) could be used to scrub any visible stains. Finally, the shower cleaner tool 84 could be used to rinse the restroom cleaner off and remove whatever level of soiling was present and apply sanitizer in one step, in total taking approximately another ten seconds. Furthermore, the cleaning of the shower would be automatically documented by the mobile and internet connected cleaning cart of some embodiments.

For cleaning a large restroom, the mobile and internet connected cleaning cart would first be used to apply restroom cleaner to the outside of surfaces and counters using the forty-five degree tool with the full cone nozzle of the cone spray tool 82. Toilet bowl cleaner would be applied to the inside of toilets and urinals using the same tool. Long handled scrubbing tools would be used as needed to clean stains. Then restroom cleaner would be sprayed on the entire floor. Generally, there are two strengths of restroom cleaner. Each would be used as needed in different areas depending on soil levels.

As required, the mobile and internet connected cleaning cart would be used to fill spray bottles of glass cleaner using the bottle filler tool. The glass cleaner would be used to clean any glass surfaces and other surfaces that are best cleaned with a spray bottle.

Next, the solution on the floor would be agitated with a long-handled brush as needed and then squeegeed to the drain. Alternatively, the solution could be picked up with a mop or wet vacuum. If required, the mobile and internet connected cleaning cart would be used to spray sanitizer using the tool and then air dry. Another very difficult cleaning task is kitchen floors where slip accidents occur regularly because the floors are inadequately cleaned with mops and buckets. Kitchens would be cleaned in a similar manner to restrooms except using all-purpose or heavy-duty cleaners instead of a restroom cleaner. The restrooms and kitchens can be sanitized after cleaning rather than current methods that try to do both at once (but which actually accomplish neither one effectively). This system and mobile and internet connected cleaning cart will clean better and sanitize better with less labor.

Finally, the mobile and internet connected cleaning cart can be used with hydrogen peroxide as one of the concentrates and an alkaline concentrate as another acting as a cleaner and activator of the hydrogen peroxide. This will be very useful for carpet care and may eventually be the preferred means of disinfecting hard surfaces. Using this method, the hydrogen peroxide is very stable in the container but becomes very active when combined in the manifold two seconds before it is applied to the surface to be cleaned or disinfected.

Additionally, the mobile and internet connected cleaning cart of the present disclosure can be adapted for use in any industry where liquids need to be injected into a water stream immediately prior to application for the purpose of cleaning (or other). The mobile and internet connected cleaning cart does this with more flexibility than anything used today and has the capability to maintain data on its usage. Examples of this would be a similar, but much smaller, version for household cleaning, a similar system for agricultural spraying applications, or a similar system for industrial cleaning. These are just examples of the possibilities.

Figure 8:
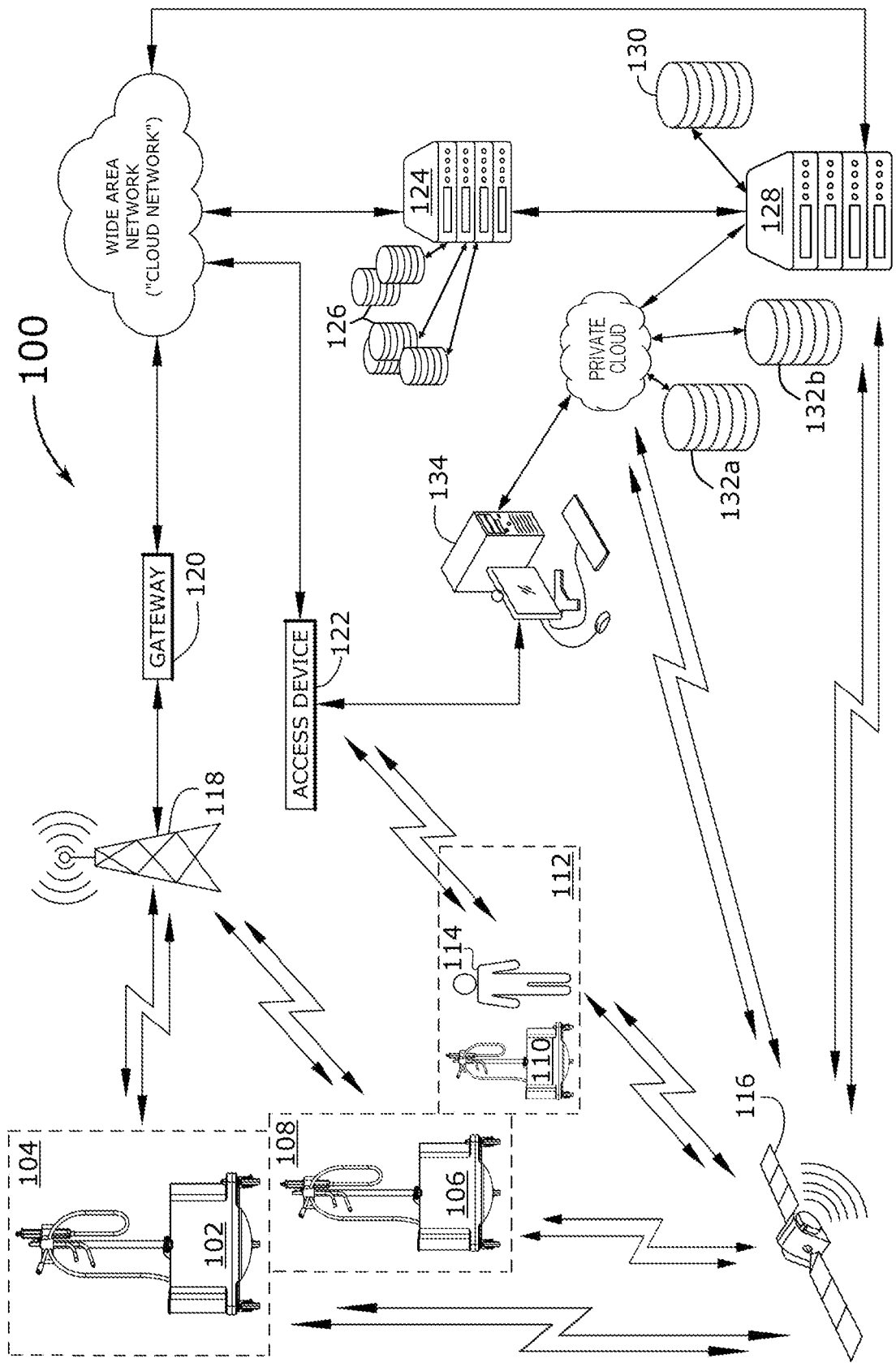
FIG. 8 conceptually illustrates a network architecture of a connected cleaning cart cloud system that hosts a connected cleaning card cloud application service in some embodiments.

By way of example, FIG. 8 conceptually illustrates a network architecture of a connected cleaning cart cloud system 100 that hosts a connected cleaning card cloud application service to which mobile and internet connected cleaning carts connect and transmit data in some embodiments. As shown in this figure, the connected cleaning cart cloud system 100 includes a plurality mobile and internet connected cleaning carts deployed for cleaning at a plurality of different geographical locations. Specifically, the plurality of mobile and internet connected cleaning carts comprise a first mobile and internet connected cleaning cart 102 at a first geographical location 104, a second mobile and internet connected cleaning cart 106 at a second geographical location 108, and a third mobile and internet connected cleaning cart 110 at a third geographical location 112 (associated with a particular operating user 114). The connected cleaning cart cloud system 100 also includes a global positioning system (GPS) satellite 116 that provides real-time location information to the mobile and internet connected cleaning carts at their respective geographical locations. While the GPS satellite 116 is shown as only a single satellite, it is intended as a representation of multiple satellites, such as three satellites which can transmit location information to the mobile and internet connected cleaning carts to calculate its own location by a method that determines location, such as triangulation or other such methods. In some embodiments, an onboard computing device, such as the PCB/Arduino control unit 26, includes a GPS receiver to receive the location data from the GPS satellites 116.

In some embodiments, the connected cleaning cart cloud system 100 includes several back-end components and hosts a cloud application service which enables the plurality mobile and internet connected cleaning carts to transmit usage data to the back-end components. The back-end components of the connected cleaning cart cloud system 100 include at least a communication tower 118 and gateway 120, network access device 122, one or more cleaning service management systems 124, a plurality of cleaning service records databases 126 for persistent storage of cleaning records as automatically tracked and transmitted by the plurality mobile and internet connected cleaning carts to the cloud application service, a back-end web server 128 on which a software program for the cloud application service is installed and runs, a user credentials database 130, and one or more merchant service cleaning contract databases 132*a* and 132*b*. In some embodiments, an administrator computing device 134 connects directly to the back-end web server 128 to perform administration, registration, geo-location analytics, configuration, data reports, etc.

The present invention embodied as a mobile and internet connected cleaning cart may perform one or more automated, system-based methods, PCB-based automated and embedded programs, carried out by embedded software or programs, or a computer program product or any combination thereof (collectively and/or individually referred to as "software" as a "computer program product"). The computer program product may include a non-transitory computer readable storage medium or media having computer readable program instructions thereon for causing a processor to carry out aspects of the present invention. The computer readable storage medium can be a tangible device that can retain and store instructions for use by an instruction execution device, such as the PCB/Arduino control unit 26. The computer readable storage medium may be, for example, but is not limited to, an electronic storage device or storage module, a magnetic storage device or storage module, an optical storage device or storage module, an electromagnetic storage device or storage module, a semiconductor storage device or storage module, or any suitable combination of the foregoing.

Thus, many of the above-described features and applications are implemented as software processes which are specified in embedded programs or embedded programming as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is also meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
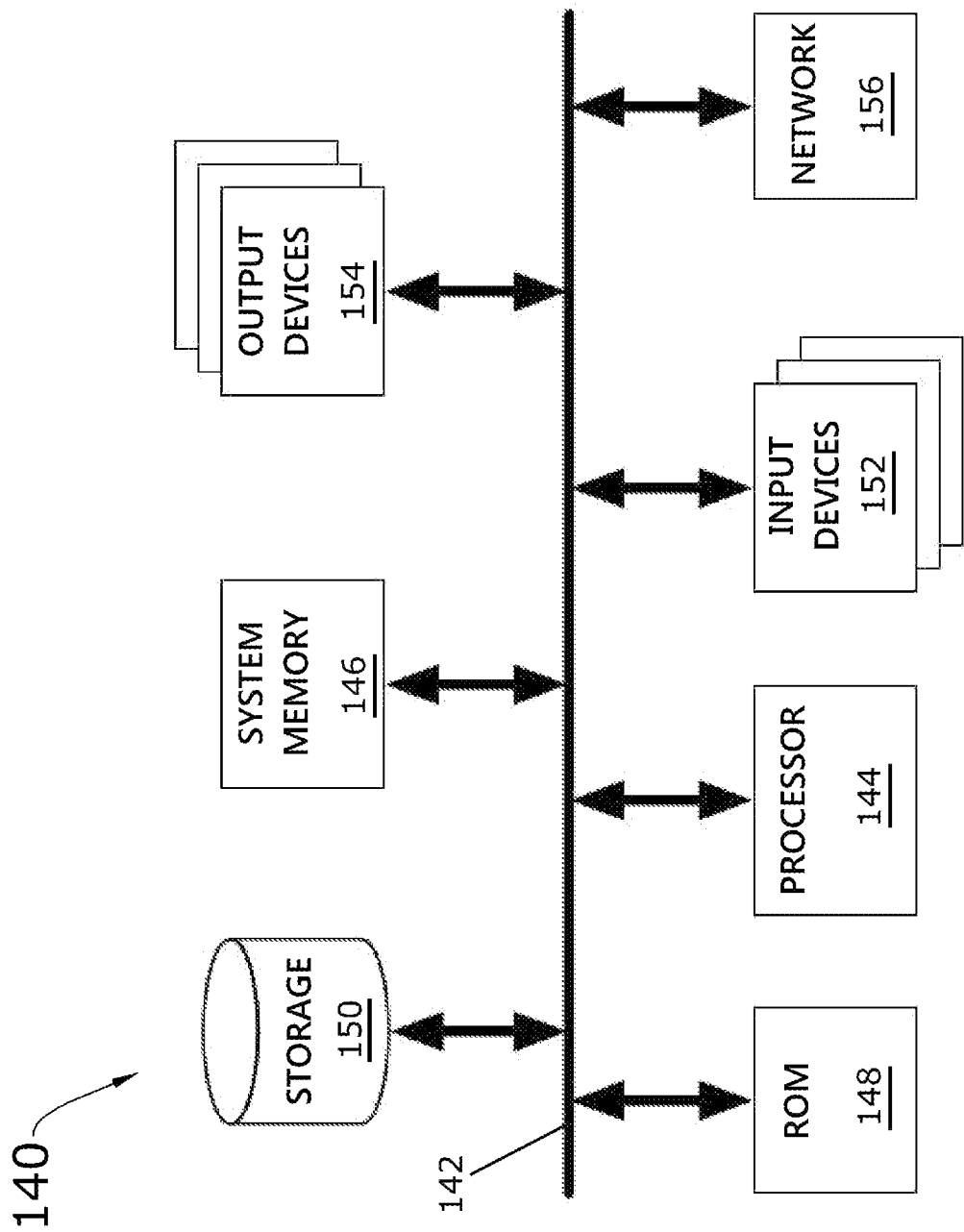
FIG. 9 conceptually illustrates an electronic system with which some embodiments of the invention are implemented.

FIG. 9 conceptually illustrates an electronic system 140 with which some embodiments of the invention are implemented. The electronic system 140 may be a computer, such as an Arduino or other single board computer (SBC), or a printed circuit board (PCB) with a processing unit and applicable memory and communication modules, or any other sort of electronic device. Such an electronic system includes various types of computer readable media and interfaces for various other types of computer readable media. Electronic system 140 includes a bus 142, processing unit(s) 144, a system memory 146, a read-only memory 148, a permanent storage device 150, input devices 152, output devices 154, and a network 156.

The bus 142 collectively represents all system, peripheral, and chipset buses that communicatively connect the numerous internal devices of the electronic system 140. For instance, the bus 142 communicatively connects the processing unit(s) 144 with the read-only memory 148, the system memory 146, and the permanent storage device 150.

From these various memory units, the processing unit(s) 144 retrieves instructions to execute and data to process in order to execute the processes of the invention. The processing unit(s) may be a single processor or a multi-core processor in different embodiments.

The read-only-memory (ROM) 148 stores static data and instructions that are needed by the processing unit(s) 144 and other modules of the electronic system. The permanent storage device 150, on the other hand, is a read-and-write memory device. This device is a non-volatile memory unit that stores instructions and data even when the electronic system 140 is off. Some embodiments of the invention use a mass-storage device (such as a magnetic or optical disk and its corresponding disk drive) as the permanent storage device 150.

Other embodiments use a removable storage device (such as a floppy disk or a flash drive) as the permanent storage device 150. Like the permanent storage device 150, the system memory 146 is a read-and-write memory device. However, unlike storage device 150, the system memory 146 is a volatile read-and-write memory, such as a random access memory. The system memory 146 stores some of the instructions and data that the processor needs at runtime. In some embodiments, the invention's processes are stored in the system memory 146, the permanent storage device 150, and/or the read-only memory 148. For example, the various memory units include instructions for processing appearance alterations of displayable characters in accordance with some embodiments. From these various memory units, the processing unit(s) 144 retrieves instructions to execute and data to process in order to execute the processes of some embodiments.

The bus 142 also connects to the input and output devices 152 and 154. The input devices enable the user to communicate information and select commands to the electronic system. The input devices 152 include alphanumeric keyboards and pointing devices (also called "cursor control devices"). The output devices 154 display images generated by the electronic system 140. The output devices 154 include printers and display devices, such as liquid crystal displays (LCD) and organic light emitting diode (OLED) displays. Some embodiments include devices such as a touchscreen that functions as both input and output devices.

Finally, as shown in FIG. 9, bus 142 also couples electronic system 140 to a network 156 through a network adapter (not shown). In this manner, the computer can be a part of a network of computers (such as a local area network ("LAN"), a wide area network ("WAN"), or an intranet), or a network of networks (such as the Internet). Any or all components of electronic system 140 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While the invention has been described with reference to numerous specific details, one of ordinary skill in the art will recognize that the invention can be embodied in other specific forms without departing from the spirit of the invention. For instance, the mobile and internet connected cleaning cart described in this specification would be helpful anywhere multiple concentrated liquids need to be precisely diluted and then sprayed onto surfaces or placed into containers using a mobile device. Some applications would involve agricultural or other plant care applications. Plants could be watered, fed and protected from pests in one step using precise programs. Some industrial applications might involve cleaning and then treating equipment with lubrication, protective coatings or other concentrated materials. Therefore, a person of ordinary skill in the relevant art would understand that the invention is not to be limited by the foregoing illustrative details, but rather is to be defined by the appended claims.

We claim:

1. A mobile and internet connected cleaning cart comprising:
   a rotomold body;
   a plurality of casters attached to a bottom side of the rotomold body;
   a plurality of lock nuts that secure the plurality of casters to the rotomold body when the plurality of casters are attached to the bottom side of the rotomold body;
   a bottom cap attached to a first wheel corner part of the rotomold body above a first caster in the plurality of casters;
   a handle extrusion with a top end and a bottom end, wherein the bottom end of the handle extrusion fits into the bottom cap to secure the handle extrusion to the first wheel corner part in an upright vertical orientation through a square hole in a handle extrusion upper corner part of the rotomold body, wherein the bottom cap secures the handle extrusion by a handle screw and a lock nut;

a handle/holster affixed to the top end of the handle extrusion, wherein the handle/holster is configured to provide storage for a plurality of tools;

a platform that provides a flat working surface at a top side of the rotomold body;

a power switch integrated into the platform;

a solution cabinet configured to store a plurality of solution bottles, said solution cabinet disposed along one side of the rotomold body;

a solution cabinet door that is configured to secure solution bottles in the solution cabinet when closed and to allow exchange of solution bottles when open;

a hinge along which the solution cabinet door opens and closes, said hinge attached to an edge along the top side of the rotomold body;

a plurality of platform fasteners that secure the platform to the top side of the rotomold body;

a water tank configured to store water for use in cleaning;

a tank cap that provides access to the water tank;

a cap tether that secures the tank cap to the platform;

a plurality of pumps that draw solution from the solution bottles to provide a cleaning concentration;

a water pump that draws water from the water tank to combine with the cleaning concentration;

a printed circuit board (PCB) control unit comprising a processor and a wireless network communication device, wherein the PCB is configured to automatically draw precise amounts of solution from the solution bottles and automatically direct the water pump to draw a precise volume of water from the water tank to apply as an exact cleaning concentration;

a battery that provides power to the PCB, the water pump, and the plurality of pumps when the power switch is switched on;

a plurality of application tools comprising a shower cleaning tool, a cone spray tool, and a container filler tool; and a barrel connector to which each application tool in the plurality of application tools individually connects during use.

2. The mobile and internet connected cleaning cart of claim 1 further comprising a mop handle holder attached to a second wheel corner part of the rotomold body above a second caster in the plurality of casters.

3. The mobile and internet connected cleaning cart of claim 2 further comprising a holder bracket that secures a top of the mop handle holder to a top side of the rotomold body.

4. The mobile and internet connected cleaning cart of claim 1 further comprising a key lock that is disposed along the solution cabinet door and configured to lock the solution cabinet door shut.

5. The mobile and internet connected cleaning cart of claim 1, wherein the water tank comprises a volumetric capacity of six gallons.

6. The mobile and internet connected cleaning cart of claim 1 further comprising a wand keyboard device that is configured to allow a user to program specific cleaning operations, wherein the wand keyboard device is attached to the handle/holster during storage and detached from the handle/holster during use.

7. The mobile and internet connected cleaning cart of claim 6, wherein the wand keyboard device comprises a wand keyboard device housing, a bayonet/flat spray nozzle, an O-ring, and a hose assembly, wherein the wand keyboard device comprises a twelve key keyboard that is communicably connected to the processor of the PCB, wherein the user programs specific cleaning operations by selecting specific keys from the twelve key keyboard.

8. The mobile and internet connected cleaning cart of claim 7, wherein the wand keyboard device comprises a male quick connect to which a female quick connect of an application tool attaches for a cleaning application, wherein the male quick connect of the wand keyboard device incorporates the bayonet/flat spray nozzle and the O-ring.

9. The mobile and internet connected cleaning cart of claim 8, wherein the application tool comprises the shower cleaning tool.

10. The mobile and internet connected cleaning cart of claim 8, wherein the application tool comprises the cone spray tool.

11. The mobile and internet connected cleaning cart of claim 10, wherein the cone spray tool comprises a full cone nozzle.

12. The mobile and internet connected cleaning cart of claim 8, wherein the application tool comprises the container filler tool.

13. The mobile and internet connected cleaning cart of claim 1, wherein the wireless network communication device comprises a WiFi transceiver.

14. The mobile and internet connected cleaning cart of claim 1, wherein the processor comprises an Arduino single board computer.

* * * * *